United States Patent
Ortiz Diaz-Guerra et al.

(10) Patent No.: US 10,954,145 B2
(45) Date of Patent: Mar. 23, 2021

(54) METHOD OF DESALINATION AND WASTEWATER TREATMENT IN A MICROBIAL DESALINATION CELL REACTOR

(71) Applicants: FCC AQUALIA, S.A., Madrid (ES); FUNDACION INSTITUTO MADRILENO DE ESTUDIOS AVANZADOS IMDEA AGUA, Alcala de Henares (ES)

(72) Inventors: Juan Manuel Ortiz Diaz-Guerra, Alcala de Henares (ES); Abraham Esteve-Nunez, Alcala de Henares (ES); Lidia Zulema Borjas Hernandez, Alcala de Henares (ES); Victor Manuel Monsalvo Garcia, Madrid (ES); Frank Rogalla, Madrid (ES)

(73) Assignees: FCC AQUALIA, S.A., Madrid (ES); FUNDACION INSTITUTO MADRILENO DE ESTUDIOS AVANZADOS IMDEA AGUA, Alcala de Henares (ES)

(*) Notice: Subject to any disclaimer, the term of this patent is extended or adjusted under 35 U.S.C. 154(b) by 49 days.

(21) Appl. No.: 16/470,418

(22) PCT Filed: Dec. 18, 2017

(86) PCT No.: PCT/EP2017/083359
§ 371 (c)(1),
(2) Date: Jun. 17, 2019

(87) PCT Pub. No.: WO2018/109232
PCT Pub. Date: Jun. 21, 2018

(65) Prior Publication Data
US 2020/0010345 A1    Jan. 9, 2020

(30) Foreign Application Priority Data
Dec. 16, 2016 (EP) .................................. 16382615

(51) Int. Cl.
*C02F 3/00* (2006.01)
*B01D 61/42* (2006.01)
(Continued)

(52) U.S. Cl.
CPC ............ *C02F 3/005* (2013.01); *B01D 61/422* (2013.01); *B01D 61/48* (2013.01); *C02F 1/4695* (2013.01);
(Continued)

(58) Field of Classification Search
None
See application file for complete search history.

(56) References Cited

U.S. PATENT DOCUMENTS

2011/0236769 A1* 9/2011 Xie ...................... H01M 4/8605
429/401
2013/0017414 A1* 1/2013 He .......................... C02F 1/445
429/2
(Continued)

FOREIGN PATENT DOCUMENTS

EP       2390236 A1    11/2011

OTHER PUBLICATIONS

An et al., "Desalination combined with hexavalent chromium reduction in a microbial desalination cell", Desalination, 2014, vol. 354, pp. 181-188.
(Continued)

*Primary Examiner* — Chester T Barry
(74) *Attorney, Agent, or Firm* — Lucas & Mercanti, LLP

(57) ABSTRACT

Method of desalination and wastewater treatment in a microbial desalination cell reactor is provided, the microbial
(Continued)

desalination cell reactor has three compartments, an anodic compartment, a cathodic compartment and a saline compartment, the method is carried out by (a) adding electrically conductive particles or electrically conductive material in the anodic compartment and cathodic compartment, (b) adding bacteria species of the genus *Geobacter* in the anodic compartment and several solutions in the compartments (c) replacing the solutions in the cathodic compartment and in the saline compartment and (d) oxidizing organic matter present in wastewater by bacteria from the genus *Geobacter* in the anodic compartment and desalinating the solution in the saline compartment and (e) after 20 to 30 operation cycles, replacing the solution in the saline compartment by a solution of hypochlorite salt.

5 Claims, 4 Drawing Sheets

(51) Int. Cl.
| | | |
|---|---|---|
| | *B01D 61/48* | (2006.01) |
| | *C02F 1/469* | (2006.01) |
| | *C02F 3/34* | (2006.01) |
| | *H01M 8/16* | (2006.01) |
| | *C02F 101/30* | (2006.01) |
| | *C02F 103/08* | (2006.01) |

(52) U.S. Cl.
CPC ............... *C02F 3/34* (2013.01); *H01M 8/16* (2013.01); *B01D 2311/2634* (2013.01); *B01D 2311/2688* (2013.01); *C02F 2101/30* (2013.01); *C02F 2103/08* (2013.01); *C02F 2201/4616* (2013.01); *C02F 2201/4618* (2013.01); *C02F 2201/46115* (2013.01); *C02F 2303/20* (2013.01)

(56) References Cited

U.S. PATENT DOCUMENTS

| | | | | |
|---|---|---|---|---|
| 2013/0115684 | A1* | 5/2013 | Rittmann | B09C 1/10 |
| | | | | 435/262.5 |
| 2018/0166760 | A1* | 6/2018 | Santoro | H01G 11/34 |

OTHER PUBLICATIONS

Luo et al., "Microbial desalination cells for improved performance in wastewater treatment, electricity production, and desalination", Bioresource Technology, 2012, vol. 105, pp. 60-66.

Bajracharya et al., "An overview on emerging bioelectrochemical systems (BESs): Technology for sustainable electricity, waste remediation, resource recovery, chemical production and beyond", Renewable Energy, 2016, vol. 98, pp. 153-170.

Luo et al., "Concurrent Desalination and Hydrogen Generation Using Microbial Electrolysis and Desalination Cells", Environ. Sci. Technol., 2011, vol. 45, No. 1, pp. 340-344.

Zhang et al., "Microbial electrolysis cells turning to be versatile technology: Recent advances and future challenges", Water Research, 2014, vol. 56, pp. 11-25.

Mehanna et al., "Microbial Electrodialysis Cell for Simultaneous Water Desalination and Hydrogen Gas Production", Environ. Sci. Technol., 2010, vol. 44, No. 24, pp. 9578-9583.

Jadhav et al., "Comparison of oxygen and hypochlorite as cathodic electron acceptor in microbial fuel cells", Bioresource Technology, 2014, vol. 154, pp. 330-335.

International Search Report and Written Opinion for Corresponding International Application No. PCT/EP2017/083359 (14 Pages) (Feb. 14, 2018).

\* cited by examiner

METHOD OF DESALINATION AND WASTEWATER TREATMENT IN A MICROBIAL DESALINATION CELL REACTOR

CROSS REFERENCE TO RELATED APPLICATION

This Application is a 371 of PCT/EP2017/083359, filed Dec. 18, 2017, which claims the benefit of European Patent Application No. 16382615.9, filed Dec. 16, 2016, each of which are incorporated herein by reference.

FIELD OF THE INVENTION

The present invention is related to a method of desalination and wastewater treatment in a microbial desalination cell reactor. Particularly, the present invention is related to a method for simultaneously treat wastewater and desalinate brackish/saline water using a new method based on a Microbial electrochemical Technology.

BACKGROUND ART

Microbial Electrochemical Technologies (METs) represent a number of technologies where bacteria interact with electrically conductive material. For instance, Microbial Fuel Cell (MFC) converts chemical energy into electrical energy by using microorganisms. In this kind of electrochemical bioreactor, the oxidation of organic matter is carried out by microorganisms that efficiently transfer electrons to an electrode (anode). The circuit is closed by the presence of a cathode so electricity can be harvested.

Biological wastewater treatment is based on the biological oxidation of the organic matter present in wastewater. This oxidation needs coupling to a reduction reaction (e.g. oxygen reduction), usually limiting the process due to the high cost of artificially supply of oxygen to the system.

Microbial Desalination Cells (MDC) are bioelectrochemical devices where biological wastewater treatment can be effectively coupled to desalination of a saline stream. A MDC consists of an electrodialysis unit cell allocated in a MFC, in which at least one of the electrodes, normally the anode, host a biofilm to produce the electrochemical oxidation of the organic matter. By using the electric potential generated in the microbial cells, the migration of the ions is enhanced and desalination is achieved.

MDC devices are able to desalinate brackish/saline water by using the energy extracted from the coupled biological oxidation of organic matter present in the wastewater and reduction of oxygen (air).

Electrodialysis is a membrane based technology that is able to desalinate saline streams with low energy cost and has demonstrated its economic feasibility in a broad number of processes. Electrodialysis has the advantage of combining easy operation with flexibility in variation of operation conditions. Moreover, the energy used to drive the migration of ions across the membranes is in the range of the energy provided by bioelectrogenic bacteria that oxidizes organic matter in a MFC.

MDC represent a feasible solution to provide desalinated water at zero cost, as they uses the energy produced by the coupled reactions of oxidation of organic matter (contained in the wastewater) and the reduction of oxygen. Besides, from a theoretical point of view, it is possible to harvest some useful electric energy by decreasing the production of desalinated water. So, in these cases, electric power is obtained at the same time saline water is desalinated, and wastewater is treated in the same device.

In spite of MDC devices represent a promising technology for water desalination, at the moment it could be considered that the production is too low to have practical relevance. For this reason, the application of these devices (MDC) in real environments requires i) to increase the production of desalinated water, ii) develop a proper strategy for start-up process, and iii) develop strategies to avoid biofouling on the membranes for industrial deployment of the MDC concept.

SUMMARY OF INVENTION

In a first aspect, the present invention provides a method of desalination and wastewater treatment in a microbial desalination cell reactor, characterized in that the microbial desalination cell reactor comprises three compartments, an anodic compartment (1), a cathodic compartment (2) and a saline compartment (3), wherein an anionic exchange membrane (4) is placed between the anodic compartment and the saline compartment and a cationic exchange membrane (5) is placed between the cathodic compartment (2) and the saline compartment (3), comprising:

(a) adding electrically conductive particles or electrically conductive material in the anodic compartment (1) and cathodic compartment (2),
(b) adding bacteria species of the genus *Geobacter* in the anodic compartment (1), adding an aqueous solution comprising an electrolyte, as catholyte, in the cathodic compartment (2), adding a saline solution in the saline compartment (3) and desalinating said saline solution by applying an external power supply,
(c) when constant electric current is achieved, replacing the solution in the cathodic compartment (2) by a first hypochlorite solution comprising soluble hypochlorite salts and replacing the external power supply by an external circuit or connecting anode and cathode to produce short circuit conditions,
(d) oxidizing organic matter present in wastewater by bacteria from the genus *Geobacter* in the anodic compartment (1), and desalinating said saline solution in the saline compartment (3) and
(e) after 20 to 30 operation cycles, replacing the solution in the cathodic compartment (2) by a solution of a second hypochlorite solution comprising soluble hypochlorite salts.

Desalination of brackish/saline water is an energy costly process. Thus, the method of the first aspect of the invention is of great interest for the production of drinking water and industrial applications.

The method of the first aspect of the invention increases the production of desalinated water in a conventional microbial desalination cell by using a hypochlorite salt in aqueous solution as electron acceptor in the cathodic compartment instead of using oxygen reduction as cathodic reaction at pH=7. By doing this, the energy available for the desalination is increased, and microbial desalination cell overcomes long-standing problems and limitations of this kind of methods (low desalination rate, membranes fouling and scaling-up), allowing the market replication of such devices.

Moreover, the method of the first aspect of the invention includes an efficient start-up protocol where a desalination rate up to 94% of the maximum theoretical rate is reached from the first cycle of operation. First, the microbial desalination cell unit is operated as a conventional and abiotic electrodialysis cell in batch mode. Once electroactive bacteria are introduced in the system, the desalination of a first saline solution is operated in a microbial electrolysis configuration (external power supply). Finally, with a mature biofilm formed in the anode, the system operates as an autonomous microbial desalination cell without any external energy supply (excluding pumping energy) reaching around 87% of salts rejection.

The method of the first aspect of the invention is useful for carrying out systematic studies about the microbial desalination cell behavior under different experimental conditions, which also allows scaling-up the process.

*Geobacter* bacteria transfer electrons to electrodes through cytochrome C proteins located in the extracellular membrane of the bacteria (Beatriz Maestro, Juan M. Ortiz, Germán Schrott, Juan P. Busalmen, Victor Climent, Juan M. Feliu, Crystallographic orientation and electrode nature are key factors for electric current generation by *Geobacter sulfurreducens*, Bioelectrochemistry, Volume 98, August 2014, Pages 11-19); said cytochrome C proteins are present in all disclosed species of *Geobacter*.

Anionic exchange membrane (4) and cationic exchange membrane (5) are heterogeneous or homogeneous exchanged membranes used in conventional electrodialysis.

Electrically conductive particles or electrically conductive material in the anodic compartment (1) acts as support of the active biofilm of bacteria for the treatment of wastewater. Electrically conductive particles or electrically conductive material in the cathodic compartment (2) acts as conductive material to produce electrochemical reduction of hypochlorite salt. In both anodic compartment (1) and cathodic compartment (2), an electron collector material is used to provide an electric contact without liquid leakage. This electric collector is connected by an external load (resistor) or an external electric circuit (e.g. DO-DC converter, electric accumulator, etc.)

The bacteria attached to the particles or suspended in the solution of the anodic compartment (1) oxidize the organic matter and transfer the resulting electrons into the electrically conductive particles or electrically conductive material, so they can be circulated via an external circuit to the electric collector located inside the cathodic compartment (2), where they are consumed in the reductive reaction of hypochlorite to chloride ions. Simultaneously, the electric gradient created between the anodic compartment (1) and cathodic compartment (2) lead to the migration of ions from the saline compartment (3) to the anodic compartment (1) and cathodic compartment (2), decreasing the salinity of the saline solution. In addition, electric power is produced/consumed in the external load.

The system is a self-sufficient energy process as long as wastewater is fed in the anodic compartment (1), and hypochlorite aqueous solution is fed in the cathodic compartment (2). Biofouling formation on membranes have been claimed as the main limiting factor for the long-term operation of microbial desalination cells. With the method of the first aspect of the invention, fouling can be significantly mitigated by circulating the hypochlorite stream through the middle compartment. By doing this, biofouling is removed and the microbial desalination cell recovers the initial performance. This methodology can be considered as a Clean-In-Place procedure, and offers a competitive advantage over conventional microbial desalination cells.

Another embodiment is the method of the first aspect of the invention, wherein said electrically conductive particles or electrically conductive material is selected from the group consisting of graphite particles, activated carbon, vitreous carbon and carbon felt.

Another embodiment is the method of the first aspect of the invention, wherein said aqueous solution comprising an electrolyte, as catholyte, is an aqueous solution of a sulphate salt.

Another embodiment is the method of the first aspect of the invention, wherein said saline solution is a solution comprising soluble bicarbonate salts.

Another embodiment is the method of the first aspect of the invention, wherein said external circuit is selected from the group consisting of resistor, DC-DC converter and electric accumulator.

The hypochlorite solution used in the cathodic compartment (2) could be regenerated using a conventional electrochemical device powered by photovoltaic energy, increasing the sustainability of the system.

The main advantages of the present invention are:

a. Enhancement of biodegradation rates of organic matter and desalinated water production by combining the exocellular ability of *Geobacter* to oxidize organic matter and the high reduction potential of hypochlorite.

b. Start-up procedure to initiate the desalination process at MDC units from the first cycle.

c. Simultaneous production of desalinated water and treated wastewater in a self-sufficient energy system, and obtaining marginal electric power when required.

d. Minimizing the solid waste production (biomass) from wastewater treatment due to the negligible growth yield of electrogenic bacteria (*Geobacter*).

e. Cleaning-In-Place strategy developed to avoid performance deterioration of the system due to biofouling formation.

f. Real time and in situ monitoring of the biodegradation rate and desalinated water production through electric current measurement.

g. No production of greenhouse gas (or negligible methane production).

DESCRIPTION OF EMBODIMENTS

Example 1

Figure 1:
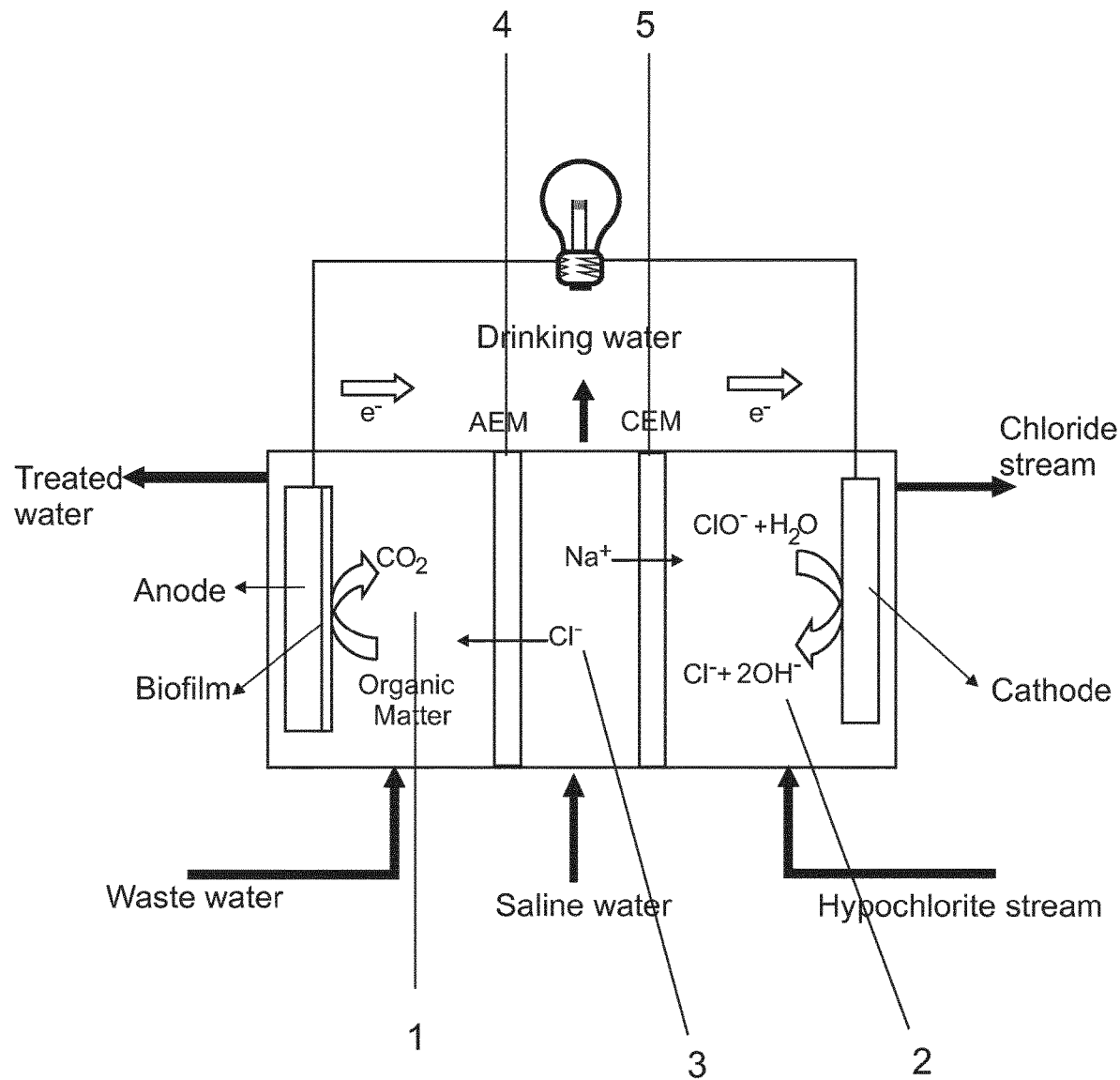
FIG. 1. Scheme of Microbial Desalination Cell operating with hypochlorite as electron acceptor in the cathodic compartment.
Figure 2:
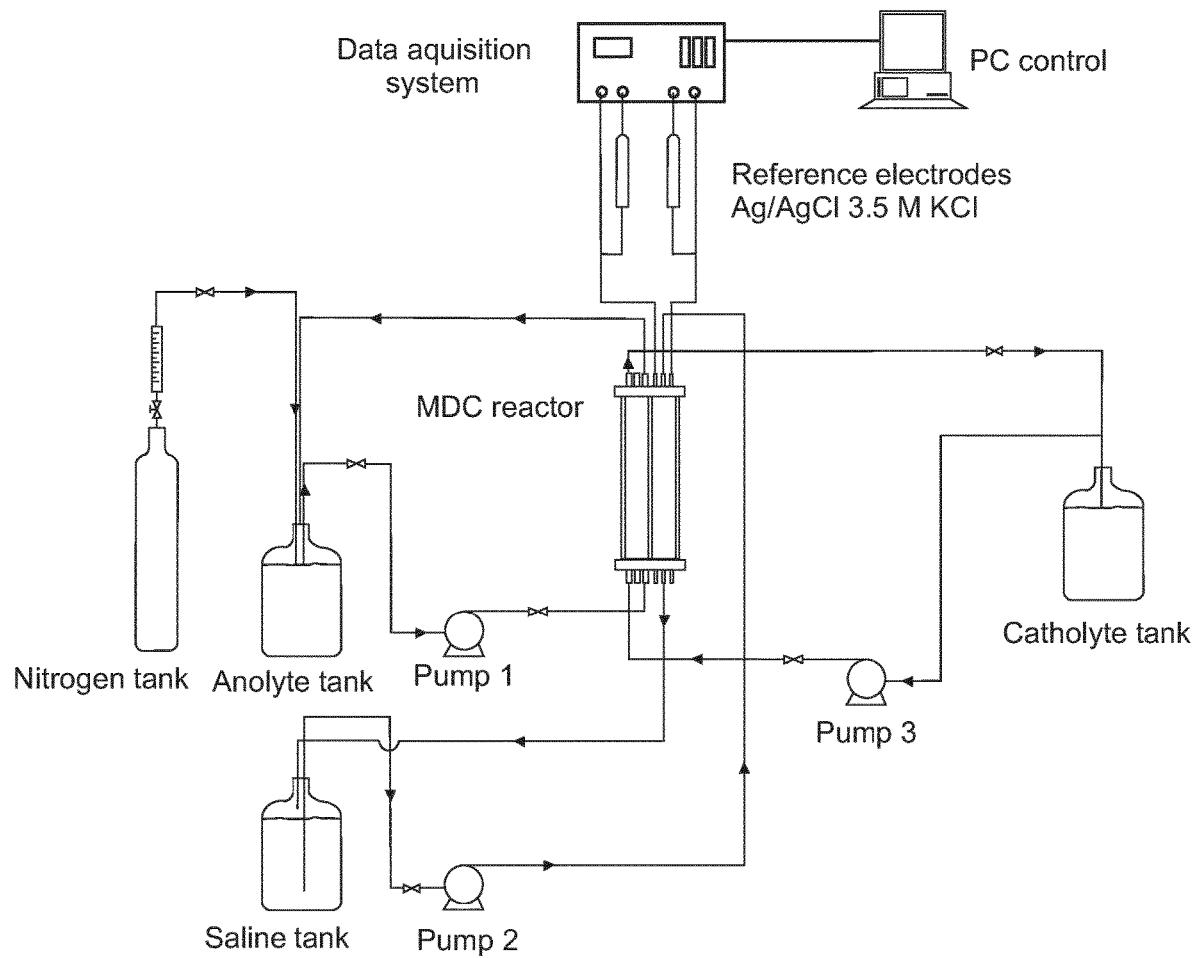
FIG. 2. MDC system flow chart diagram.
Figure 3:
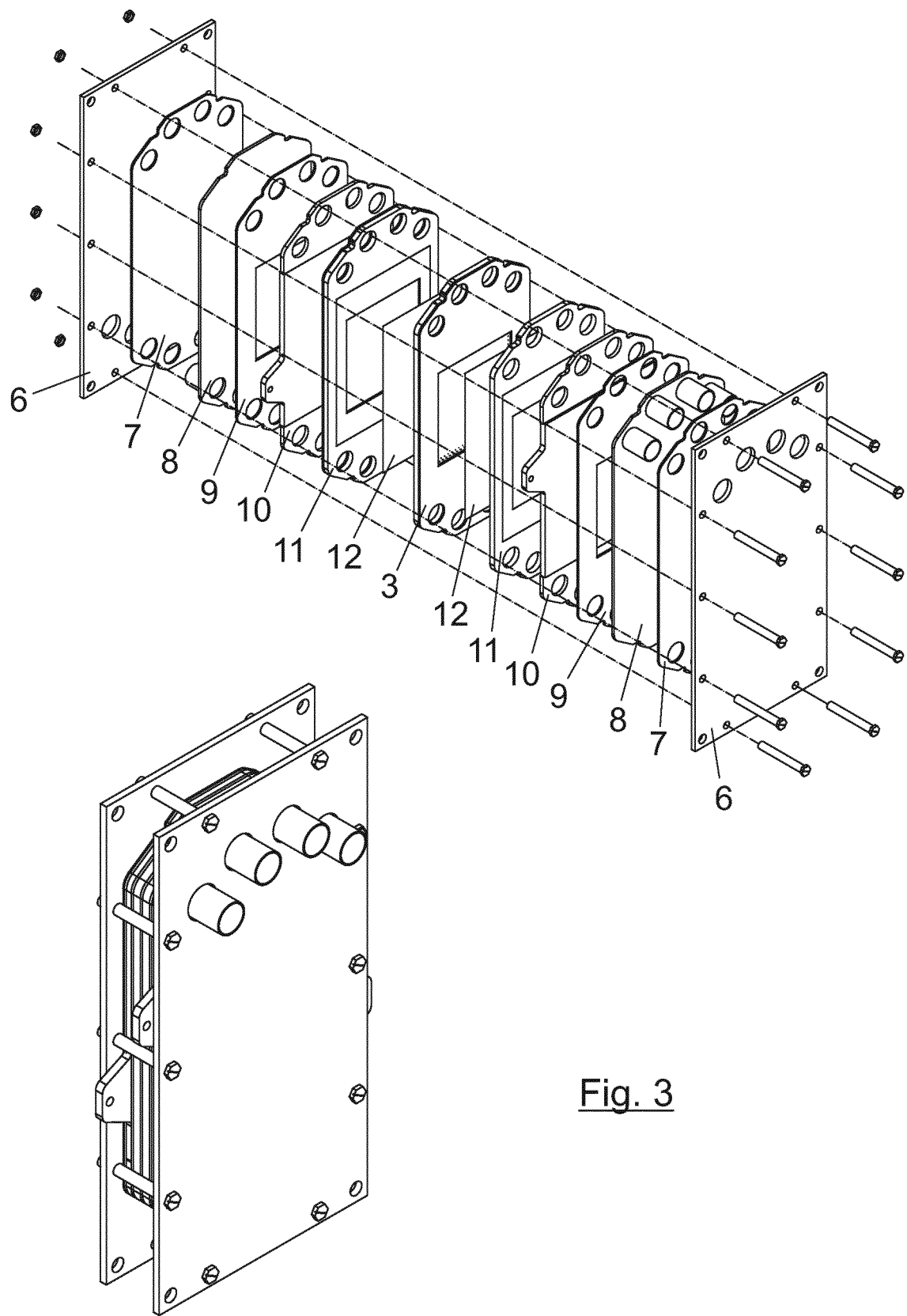
FIG. 3. MDC elements and configuration. MDC elements: 6: end plates. 7: end gaskets, 8: end compartment (inlets-outlets), 9: inner gaskets, 10: electrode collector, 11: ion exchange membrane, 12: compartment+turbulence promoter (desalination chamber).

Simultaneous Oxidation of Organic Matter, Saline Water Desalination and Electric Power Generation in a Microbial Desalination Cell.

Stage 1: The MDC reactor is a three chamber electrochemical reactor with a collector area of 100 cm² and a compartment length of 12 mm (E-Cell). The anodic chamber is filled with carbon felt RVC 4000 (Mersen Ltd) and a graphite plate was used as electric current collector. Conducting paste was used to glue the carbon felt to the collector. A graphite plate was used as cathode, and a turbulence promoter was located inside the cathodic chamber.

Electrodialysis conventional membranes, AMX (anionic) and CMX (cationic) (Astom Corporation) were used as ion exchange membranes. Two reference electrodes (Ag/AgCl 3.5 M) were placed in the geometric centre of both anodic and cathodic compartments in order to measure anodic and cathodic potentials.

*G. sulfurreducens* is cultured in batch using a fresh water medium (FWM) containing: 10 mM Acetate/40 mM Fumarate, flushed with oxygen-free $N_2/CO_2$ (80/20, v/v) at 30° C. Inoculation of ⅒ of a stationary phase culture (0.4 Optical Density units) into the MDC anodic compartment containing FWM with 20 mM acetate (anode electrode as sole electron acceptor) is carried out. A sodium bicarbonate ($NaHCO_3$) 30 mM (pH 8.7, electrical conductivity (EC) 5.1 mS cm$^{-1}$) solution is used as saline stream. As cathodic stream, an aqueous solution of sodium sulphate ($Na_2SO_4$) 25 mM is used. An external power supply is employed to apply a cell potential of 1-3 V between anode (positive terminal) and cathode (negative terminal). Saline stream ($NaHCO_3$) is circulated through the desalination compartment. The anode was maintained at +0.3-0.5 V (batch mode) during the biofilm growing period, until reaching steady-state (constant electric current).

Stage 2: Once the bioanode is fully developed in the anodic compartment (constant current at stage 1), bicarbonate stream is replaced by saline stream (i.e. aqueous solution to be desalinated, for example, NaCl 5-10 g L$^{-1}$). Catholyte is replaced by sodium hypochlorite (for example, NaClO 3% solution, pH 11.1, EC 14.57 mS cm$^{-1}$).

Then, power supply/potentiostat is removed from the system; an external load is connected to anodic and cathodic electric collectors. When needed, the external load could be substituted by an electric wire (External resistance≈0 Ω) to obtain maximum desalination rate. The electric current decreases when desalination is completed. Then, a next batch of saline water is fed in the desalination compartment to initiate the desalination process. When the electric current is not enough to drive the migration of ions, wastewater and/or sodium hypochlorite is again introduced in the system to recover the system performance.

Stage 3: Clean-In-Place procedure is operated every 20-30 cycles, in order to remove biofouling formed on the membranes surface. Once the hypochlorite is circulated through the middle compartment, the system is then operated as stage 2. This cleaning strategy enhances the stability and performance during the long-term operation of the MDC system.

Example 2

Figure 4:
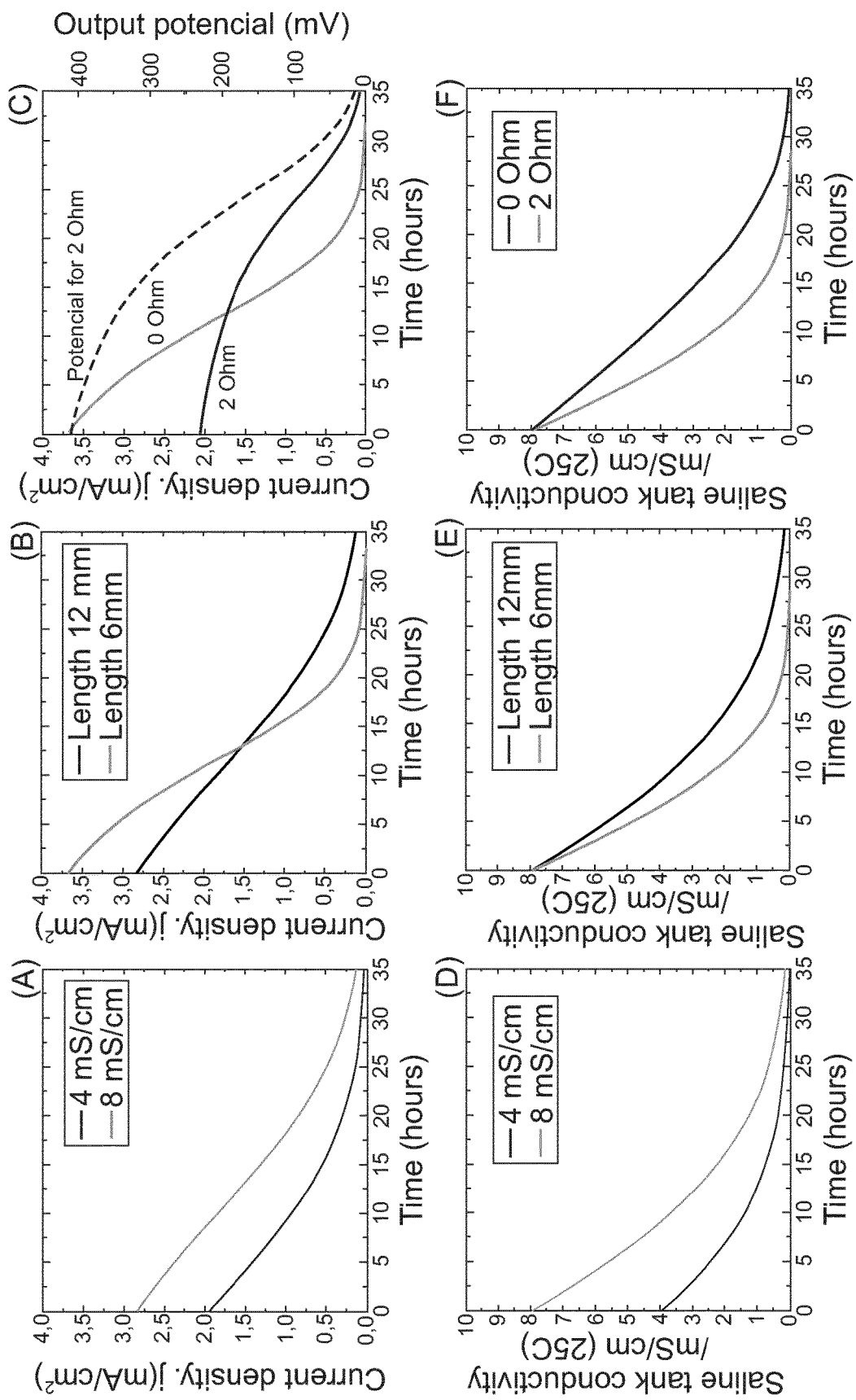
FIG. 4. MDC desalination experiments examples. Time-evolution of current density (upper row) and saline tank conductivity (lower row). Operation conditions: anolyte conductivity 4.1 mS/cm, catholyte conductivity 6.3 mS/cm. Anolyte tank: 10 L, catholyte tank: 10 L, and saline tank: 2 L. Flow rate: 100 mL/min. Operation under short circuit conditions with two different initial conductivities 4 and 8 mS/cm (A and D). Operation with two different compartment lengths under short circuit conditions and 8 mS/cm initial conductivity (B and E). Operation with a saline compartment of 6 mm long and initial conductivity 8 mS/cm under short circuit conditions and external resistor of 2 Ohm (C and F).

Experiments of Simultaneous Oxidation of Organic Matter, Saline Water Desalination and Electric Power Generation in a Microbial Desalination Cell Six experiments according to the process of the invention were carried out in the operation conditions disclosed in Table 1. The results are also shown in FIG. 4.

TABLE 1

Results: final conductivity 0.5 mS/cm, anolyte 20 mM Acetate + fresh water medium (FWM), catholyte NaClO (3%).

| Experiment id | Volume Anolyte/Catholyte/ Saline Tanks (L) | Saline compartment length (mm) | Initial/ Final Conductivity (mS/cm 25° C.) | External resistor (Ohm) | Energy produced (Wh/m²) | Desalination time (h)/ Water production (m³/day m²) |
|---|---|---|---|---|---|---|
| 1 | 10/10/2 | 12 | 8-0.5 | 0 | 0 | 18.2-0.27 |
| 2 | 10/10/2 | 6 | 4-0.5 | 0 | 0 | 11.0-0.43 |
| 3 | 10/10/2 | 6 | 8-0.5 | 0 | 0 | 17.6-0.27 |
| 4 | 10/10/2 | 6 | 4-0.5 | 2 | 52.7 | 15.0-0.32 |
| 5 | 10/10/2 | 6 | 8-0.5 | 2 | 137.8 | 24.5-0.18 |
| 6 | 10/10/1 | 6 | 20-0.5 | 2 | 213.8 | 28.3-0.08 |

The time-evolution of current density (A, B and C) and saline tanks conductivity (D, E and F) is shown in FIG. 4.

The Project leading to this application has received funding from the European Union's Horizon 2020 research and innovation programme under grant agreement No 685793.

The invention claimed is:

1. A method of desalination and wastewater treatment in a microbial desalination cell reactor, wherein the microbial desalination cell reactor comprises three compartments, an anodic compartment, a cathodic compartment and a saline compartment, wherein an anionic exchange membrane is placed between the anodic compartment and the saline compartment and a cationic exchange membrane is placed between the cathodic compartment and the saline compartment, the method comprising:
   (a) adding electrically conductive particles or electrically conductive material in the anodic compartment and cathodic compartment, (b) adding bacteria species of the genus *Geobacter* in the anodic compartment, adding an aqueous solution comprising an electrolyte, as catholyte, in the cathodic compartment, adding a saline solution in the saline compartment and desalinating said saline solution by applying an external power supply, (c) when constant electric current is achieved, replacing the solution in the cathodic compartment by a first hypochlorite solution comprising soluble hypochlorite salts and replacing the external power supply by an external circuit or connecting anode and cathode to produce short circuit conditions, (d) oxidizing organic matter present in wastewater by bacteria from the genus Geobacter in the anodic compartment, and desalinating said saline solution in the saline compartment and (e) after 20 to 30 operation cycles, replacing the solution in the cathodic compartment by a solution of a second hypochlorite solution comprising soluble hypochlorite salts.

2. The method according to claim 1, wherein said electrically conductive particles or electrically conductive material is selected from the group consisting of graphite particles, activated carbon, vitreous carbon and carbon felt.

3. The method according to claim 1, wherein said aqueous solution comprising an electrolyte, as catholyte, is an aqueous solution of a sulphate salt.

4. The method according to claim 1, wherein said saline solution is a solution comprising soluble bicarbonate salts.

5. The method according to claim 1, wherein said external circuit is selected from the group consisting of resistor, DC-DC converter and electric accumulator.

* * * * *